United States Patent
Espina Frutos

(12) 
(10) Patent No.: US 6,491,070 B1
(45) Date of Patent: Dec. 10, 2002

(54) DEVICE FOR CAPTURING DUST IN THE LOADING OF CONCRETE MIXER TRUCKS

(76) Inventor: Juan José Espina Frutos, C/ Duque de Osuna, 77, 35118 Arinaga (Las Palmas) (ES)

( * ) Notice: Subject to any disclaimer, the term of this patent is extended or adjusted under 35 U.S.C. 154(b) by 0 days.

(21) Appl. No.: 09/959,626

(22) PCT Filed: Feb. 23, 2001

(86) PCT No.: PCT/ES01/00072

§ 371 (c)(1),
(2), (4) Date: Nov. 1, 2001

(87) PCT Pub. No.: WO01/64558

PCT Pub. Date: Sep. 7, 2001

(30) Foreign Application Priority Data

Mar. 1, 2000 (ES) ......................................... 200000498

(51) Int. Cl.⁷ .............................. B65B 1/04; B65B 3/04; B67C 3/02
(52) U.S. Cl. .............................. 141/93; 141/54; 141/65; 141/285; 141/286; 55/429; 55/467
(58) Field of Search .............................. 141/37, 54, 59, 141/65, 93, 250, 285, 286; 55/338, 340, 429–432, 467

(56) References Cited

U.S. PATENT DOCUMENTS 3,812,889 A * 5/1974 Strehlow ...................... 141/93
5,345,982 A * 9/1994 Nadeau et al. ................ 141/59

* cited by examiner

*Primary Examiner*—Timothy L. Maust
(74) *Attorney, Agent, or Firm*—Young & Thompson

(57) ABSTRACT

The device comprises a container (1) with a mouth (4') to which the end of the conduit through which cement falls into the drum (3) of a concrete mixer truck is coupled, said container being fixed and having a trap door (6) for adapting the back part of said drum (3) so that the dust originating from the fall of the cement remains inside sad container (1). Part of the dust goes out through the conduit (9) to a common collector (10) while the other part is suctioned in through a suctioning head (2) formed by a truncated cone-shaped body, the biggest base thereof being coupled to the mouth (3') for loading the drum (3) and the smallest base leading to a conduit (13) that ends in the common collector (10). The dust is suctioned in from said collector and passed through a container or hopper (22) with filters with the purpose of cleaning and final reception in a tank or common collector (20).

8 Claims, 3 Drawing Sheets

DEVICE FOR CAPTURING DUST IN THE LOADING OF CONCRETE MIXER TRUCKS

OBJECT OF THE INVENTION

The present invention refers to a device for capturing and removing the dust originated when loading the tank of a corresponding concrete mixer truck, and it is based on the provision of a fixed receptacle disposed between the concrete and the aggregates chute duct and the input mouthpiece of the corresponding concrete mixer tank, said receptacle being complemented with a vacuum head having a frusto-conical configuration, at one of which ends a mouth is established which can be disposed facing the mouthpiece of the concrete mixer tank, while a fan that is disposed in the smaller and backside base of said vacuum head, in combination with an external vacuum system, for capturing the dust and bringing it on a recipient container; all this constitutes an assembly to which the backside of the truck has adapt by means of reversing the motion of the same.

The object of the invention is to avoid the release of the dust commonly produced when loading concrete, aggregates, sand, water, etc., into concrete mixer trucks.

BACKGROUND OF THE INVENTION

Normally, the loading of a concrete mixer truck is done by positioning the same in correspondence to a hopper or silo from which, and by means of the appropriate ducts, the correspondent dose of water, aggregate and concrete is conveyed to the concrete mixer tank; all this is complemented with the appropriate weighting and volume control means in order to dose the aggregates, the concrete and also the water.

The discharge of aggregates and concrete produces, logically, dust, due to their chute, by gravity, into the tank; said dust invades the environment, and this is problematic and inconvenient. The release of dust to the outside of the concrete mixer tank is usually produced by two main reasons, one of which is due to the fact that the air moved from the inside of the tank pushes, when moved, the fine particles of aggregates and concrete falling from the correspondent hopper or silo into the tank; the second reason is due to the fact that a big amount of dust is produced when the discharged material crashes into the truck capturing hopper, which means about 15% of the light particles.

There is a system to prevent the formation of dust or to prevent the release of dust to the outside, which is the same; said system consists in an expensive assembly mounted on the upper part of a ramp to which the correspondent concrete mixer truck can access, said concrete mixer truck being positioned under a stand having aggregate and concrete discharge means, all this in such a way that said stand has an aperture in one of its sides, more specifically the one facing the ramp; the vehicle, having appropriate means, is positioned under the stand, in correspondence with said aperture, preventing in this way the release of the dust.

The above-mentioned system is not completely efficient because there is always a substantial release of dust and there are other problems such as the complexity of the assembly, its static position and the gathering of dust at the level of the same loading area or platform where the vehicle or truck is located.

DESCRIPTION OF THE INVENTION

The device of the present invention is designed to solve these problems in a completely satisfactory manner, based on a solution which is both simple and efficient: the device comprises two basic elements, one is configured as an almost sealed receptacle and it is constituted from an horizontal plate having a coupling mouth adapted to the concrete and even aggregate chute duct, in such a way that a series of flaps made of rubber in combination with fabrics, are fixed to the perimetral and rectangular edge of said plate, defining the receptacle as such, characterised by the fact that one of the flaps has a gap with an arched configuration to allow the positioning of the concrete mixer tank, when the correspondent truck moves backwards on said receptacle. Furthermore, inside said receptacle a vacuum head is provided, movable along a forward and backward direction by means of a set of bearings disposed on guides, mounted in the lateral heel plates between which a mounting shaft of said vacuum head is disposed; said vacuum head comprises a frusto-conical body, pivotable in relation to said shaft in order to allow its coupling to the loading mouthpiece of the concrete mixer tank when the truck moves backwards, characterised specially in that the movement of said vacuum head prevents any damage or deterioration of the same because when the truck moves backwards the head can move on the guides mentioned above.

Both the receptacle first mentioned above and the vacuum head include corresponding ducts through which the air is suctioned to a common collector communicating to a sort of hopper by means of which, together with the appropriate filters, the dust is filtered and falls into a tank or capturing container, all this in combination with a motor driven fan.

In relation to the coupling of the vacuum head edge to the loading mouthpiece of the concrete mixer tank, a kind of perimetral and damping screen is provided, contributing to the fixing or coupling of said vacuum head edge to the mouthpiece of the tank, more particularly, on grooves provided on the back and lateral side of the mouthpiece of the tank.

By means of the above mentioned device, when the product (concrete) falls in the concrete mixer tank, the correspondent dust will be generated during the fall and will remain inside the receptacle, in order to be released trough the duct leading to the general collector mentioned above, while the other big part of the dust is suctioned by the vacuum head and reaches also the output collector trough the correspondent duct.

DESCRIPTION OF THE DRAWINGS

In order to complete the above description and to contribute to a better understanding of the features of the invention, according to a preferred practical embodiment of the same, a set of drawings is included as a part of said description.

They are given for illustrative and not limitative purpose, in which.

PREFERRED EMBODIMENT OF THE INVENTION

Figure 1:
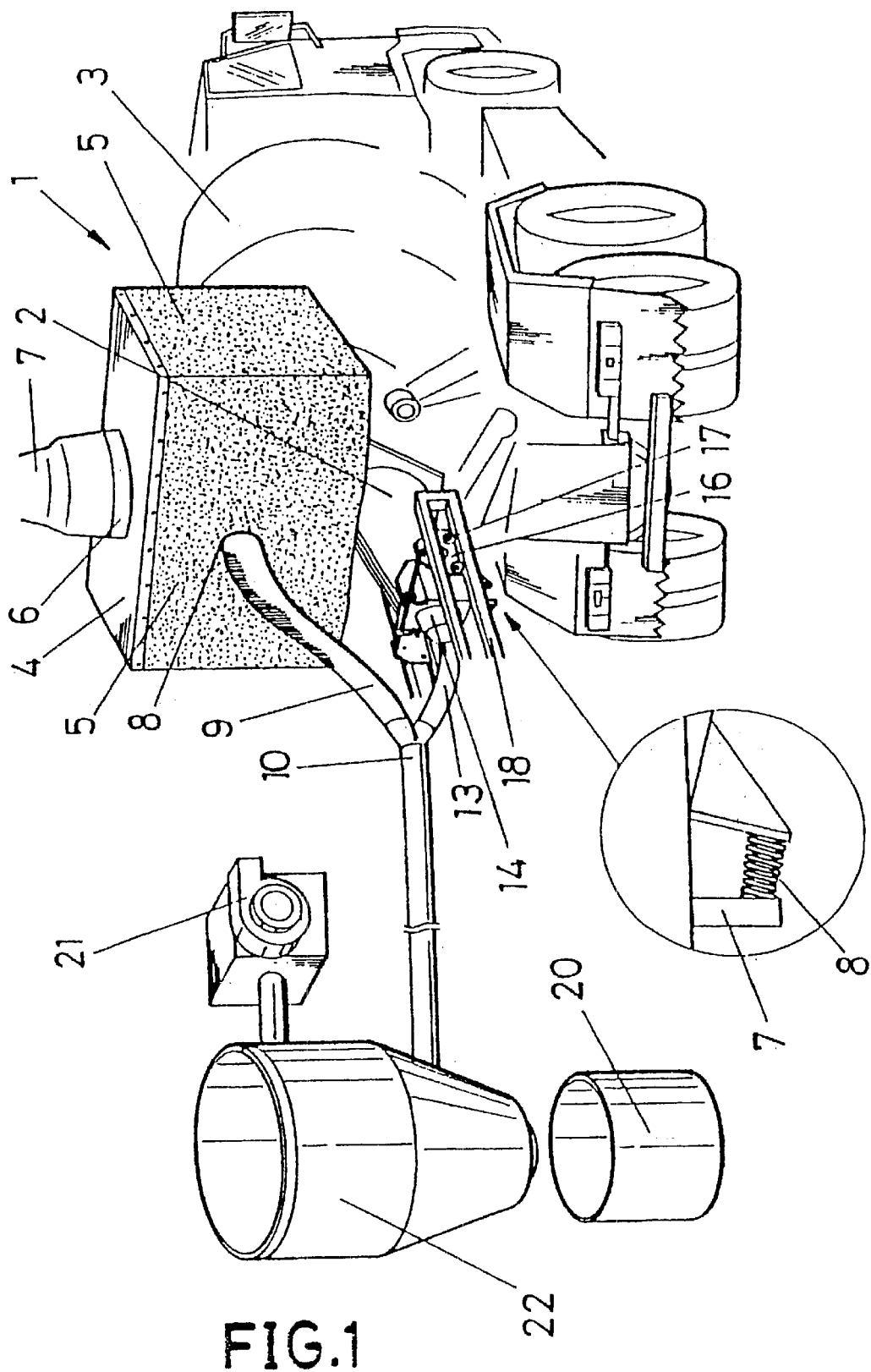
FIG. 1 shows a view according to a rear perspective of the device of the present invention when it is positioned on the rear part of the tank of a concrete mixer truck for capturing the dust produced when loading said tank.
Figure 2:
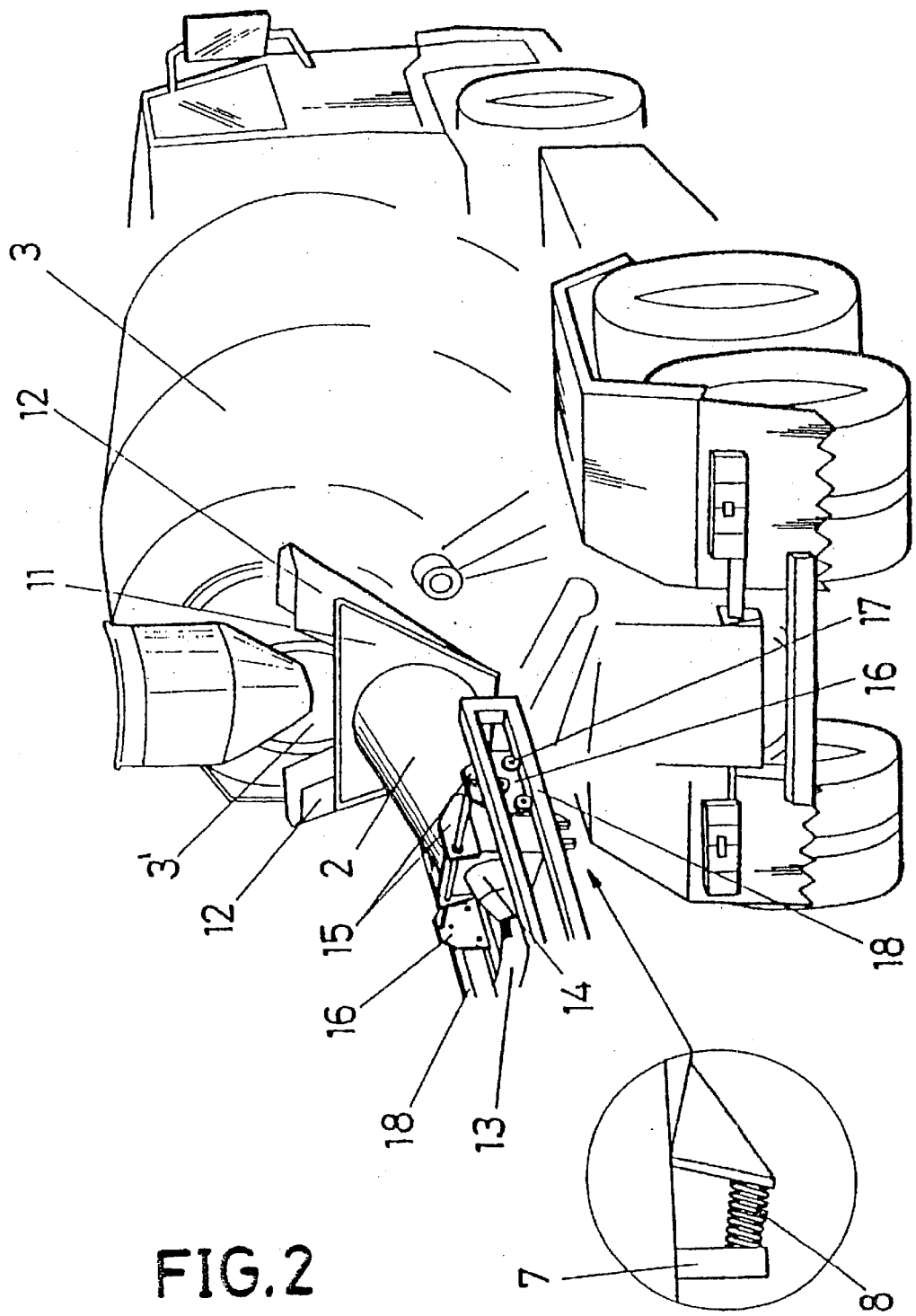
FIG. 2 shows another view according to a rear perspective representing the way in which the vacuum head is mounted on the correspondent rear part of the loading mouthpiece of the concrete mixer tank.
Figure 3:
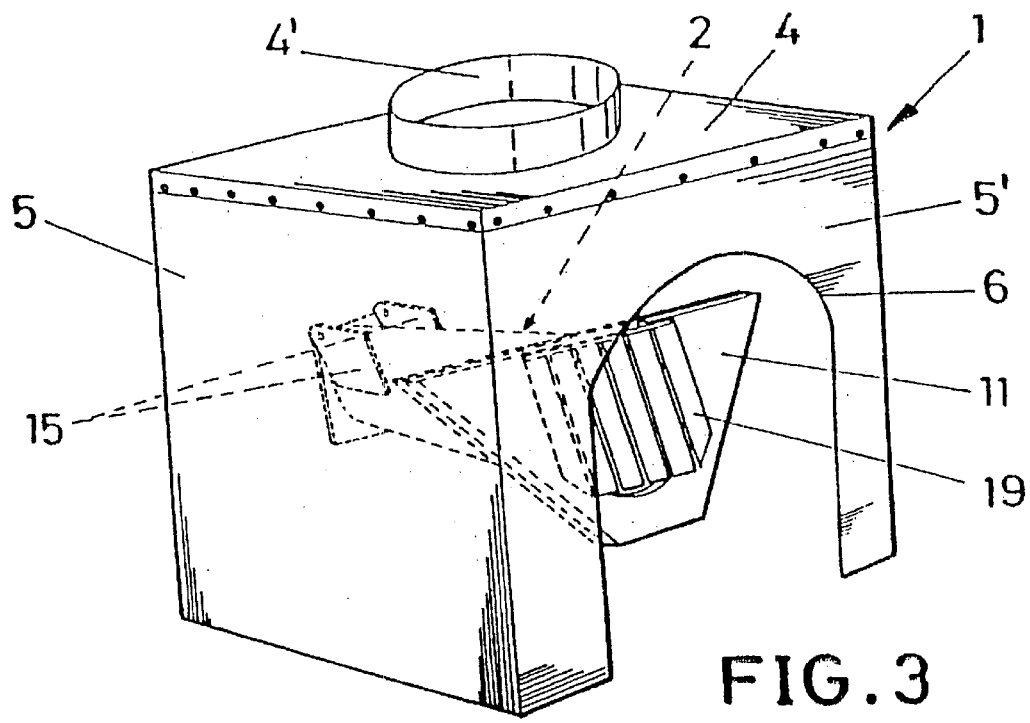
FIG. 3 shows a perspective view of the dust capturing receptacle, on the gap of which, provided in one of its sides or flaps, the rear part of the tank of the truck is adapted, the discharge of concrete and even of the aggregates being produced through said receptacle. This figure shows also the vacuum head disposed inside said receptacle, which is complemented with a filter placed in its coupling mouth, on the loading mouthpiece of the concrete mixer tank.
Figure 4:
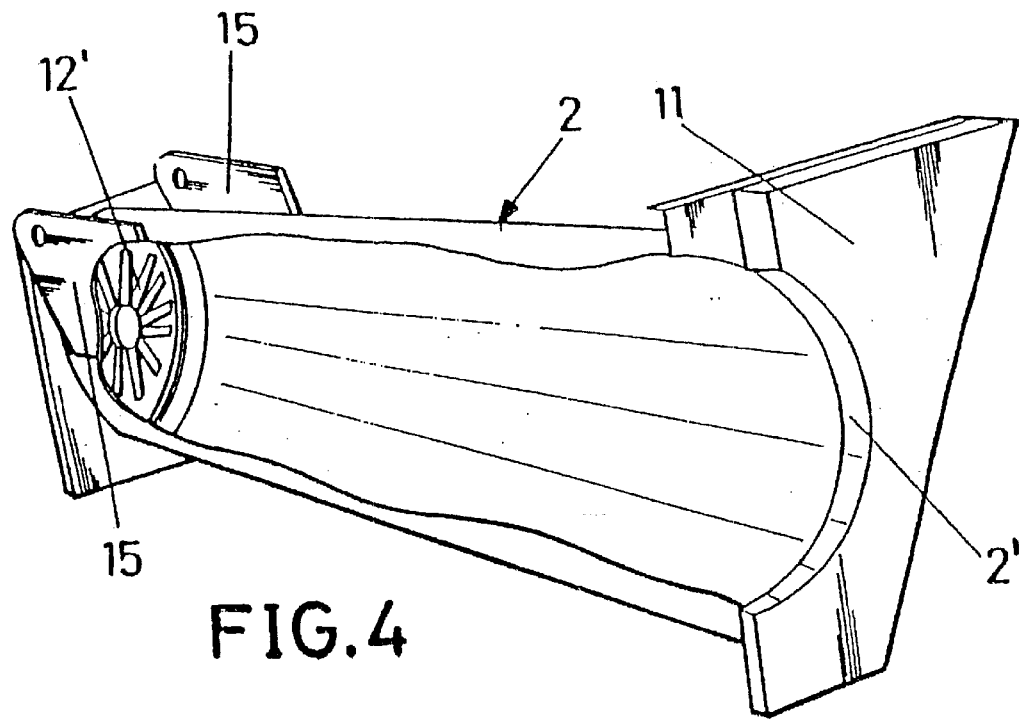
FIG. 4 shows, finally, a general perspective view of the vacuum head, a longitudinal part of which has been sectioned in order to show the situation of its fan.

As the above mentioned figures show, the device of the invention is constituted from two fundamental elements (1) and (2), the first of which is functioning as a receptacle for capturing the dust produced when loading the tank (3) of a concrete mixer truck, and the second of which is functioning as a vacuum head for suctioning said dust, and being located inside the first element.

The receptacle (1) is constituted from a preferably rectangular plate (4), on the perimeter of which a series of flaps (5) made of rubber or the like are conveniently fixed by means of screws or any other conventional means; said flaps define the receptacle as such, and said plate (4) is provided with an aperture or mouth (4') to which the lower end of a duct (7) through which the concrete and the aggregates fall when loading the concrete mixer tank (3), is coupled.

One of the flaps (5) delimiting the receptacle (1), and more concretely the one referenced as (5'), is provided with a large gap (6) with an arched configuration in order to adapt to the rear part of the tank (3) and to enable the product to access it during the loading operation, through the mouthpiece (3') of said tank (3).

The receptacle (1) is provided with an aperture in the flap opposed to the one mentioned above, to which a duct (9) flowing into a collector (10) is coupled by means of a fastener (8).

On the other hand, the vacuum head (2) of the present device determines an aspirator constituted from a frusto-conical body, as illustrated clearly in the figures, the great base of which determines a mouth (2') for coupling to the mouthpiece (3') of the tank (3); said mouth (2') is complemented with a perimetral and cushioned piece or body (11) in order to lie on the channels (12) established on the rear part of said concrete-mixer tank (3), more particularly in correspondence with the loading mouthpiece (3') of the same, in such a way that said perimetral and cushioned piece (11) cooperates in the coupling to said loading mouthpiece (3').

In correspondence with the end or small base of the frusto-conical body of the described head (2), an aspirator (12') is mounted, from which the frusto-conical body (2) extends forming a coupling to a duct (13) flowing into a common collector (10) mentioned above.

The general vacuum element or head (2) of the aspirator is pivotally mounted on a shaft (14) passing trough two lateral and rear heel plates (15) of said frusto-conical body of the vacuum head and is supported between said lateral plates (16) carrying bearings or wheels (17) sliding on fixed guides (18), by means of which the movement of the vacuum head body (2) is enabled in the forward and backward direction, while the mounting shaft (14) allows it to pivot up and down in order to adapt and couple to the loading mouthpiece (3') of the tank (3). At the entrance (2') or base having the greatest diameter of the frusto-conical body of the head (2) a grid (19) is provided, supported on the same perimetral and cushioned piece (11), said grid (19) providing a higher speed to the suctioned air.

According to this configuration, the concrete-mixer truck must be positioned conveniently, in such a way that the loading mouthpiece (3') of the tank (3) of said concrete-mixer truck be located in correspondence to the receptacle (1); the rear part of said tank (3) adapts to the gap, having a bridge configuration (6), of said receptacle (1), while the mouth (2') of the frusto-conical body of the vacuum head results also facing the loading mouthpiece (3') of the tank (3) and the cushioned piece (11) lies on the lateral channels (12) to prevent the fall of the product out of the tank (3).

In this way, through the duct (7) that can be coupled to the mouth (4') of the receptacle (1), the concrete and even the aggregates are discharged into the tank (3), in such a way that the produced dust remains inside the receptacle (1) and part of it is released through the duct (9), arriving in the common collector (10), and another part, through the vacuum set (2), arrives also in the collector (10) via the conduct (13), and from said collector to a hopper (22) in which the dust is filtered and falls into a recipient or gathering collector (20); the suction is made by means of a motor-driven fan (21), as illustrated in FIG. 1.

What is claimed is:

1. Device for capturing dust in loading of concrete mixer trucks structured to be located and conveniently correspond to a loading mouthpiece of a rear part of a tank of a concrete mixer truck, the device comprising:

a receptacle coupled to a bottom end of an inlet duct through which concrete and aggregates enter into the tank of the concrete mixer; said receptacle having a gap in one of its walls on which the rear part of the tank of the mixer truck is adapted, and a first outlet duct for capturing the dust originated during feeding of the concrete from the inlet duct into the tank; and a vacuum head located inside of the receptacle, having a frusto-conical body with a great base and a small base; the great base defining a mouth for coupling to the loading mouthpiece of the tank of the concrete mixer, while the small base comprising an aspirator leading to a second outlet duct;

the first and second outlet ducts being connected to a common collector.

2. The device according to claim 1, wherein the receptacle is made from a rectangular plate on which a series of flaps made of rubber, in combination with a fabric, are fixed, delimiting the periphery of said receptacle; one of said flaps having said gap forming an arch to adapt to the rear part of the tank, while an opposite flap has an aperture for coupling, by means of a fastener, to the first outlet duct releasing the dust to the common collector.

3. The device according to claim 1, wherein the frusto-conical body of the vacuum head is provided with heel plates having ends; a shaft passes through said heel plates, and said ends being mounted between respective lateral plates having bearings or rolling elements on a guide, enabling the vacuum body to move forward and backward and pivot for coupling to the loading mouthpiece of the tank.

4. The device according to claim 3, wherein the frusto-conical body of the vacuum head is provided, at the great base for coupling to the loading mouthpiece of the tank, with a perimetral and cushioned piece supported on channels established at the rear part of the tank for preventing the external outflow of the concrete.

5. The device according to claim 1, wherein the common collector is connected to a hopper provided with filters for filtering the dust, said dust falling into a gathering collector; a motor driven fan being operatively associated to said hopper for suctioning the dust through the common collector.

6. The device according to claim 2, wherein the common collector is connected to a hopper provided with filters for filtering the dust, said dust falling into a gathering collector; a motor driven fan being operatively associated to said hopper for suctioning the dust through the common collector.

7. The device according to claim 3, wherein the common collector is connected to a hopper provided with filters for filtering the dust, said dust falling into a gathering collector; a motor driven fan being operatively associated to said hopper for suctioning the dust through the common collector.

8. The device according to claim 4, wherein the common collector is connected to a hopper provided with filters for filtering the dust, said dust falling into a gathering collector; a motor driven fan being operatively associated to said hopper for suctioning the dust through the common collector.

* * * * *